3,840,636
METHOD OF MOLDING ARTICLES SUCH AS
GEARS INTEGRAL WITH A SHAFT
Shigeichi Deguchi and Hiroo Takagi, Nagoya, Japan, assignors to Kabushiki-Kaisha Tokai, Rika Denki Seisakusho, Aichi-ken, Japan
Claims priority, application Japan, Apr. 10, 1969,
44/27,468
Filed Apr. 3, 1970, Ser. No. 25,342
Int. Cl. B28b 7/20
U.S. Cl. 264—318
2 Claims

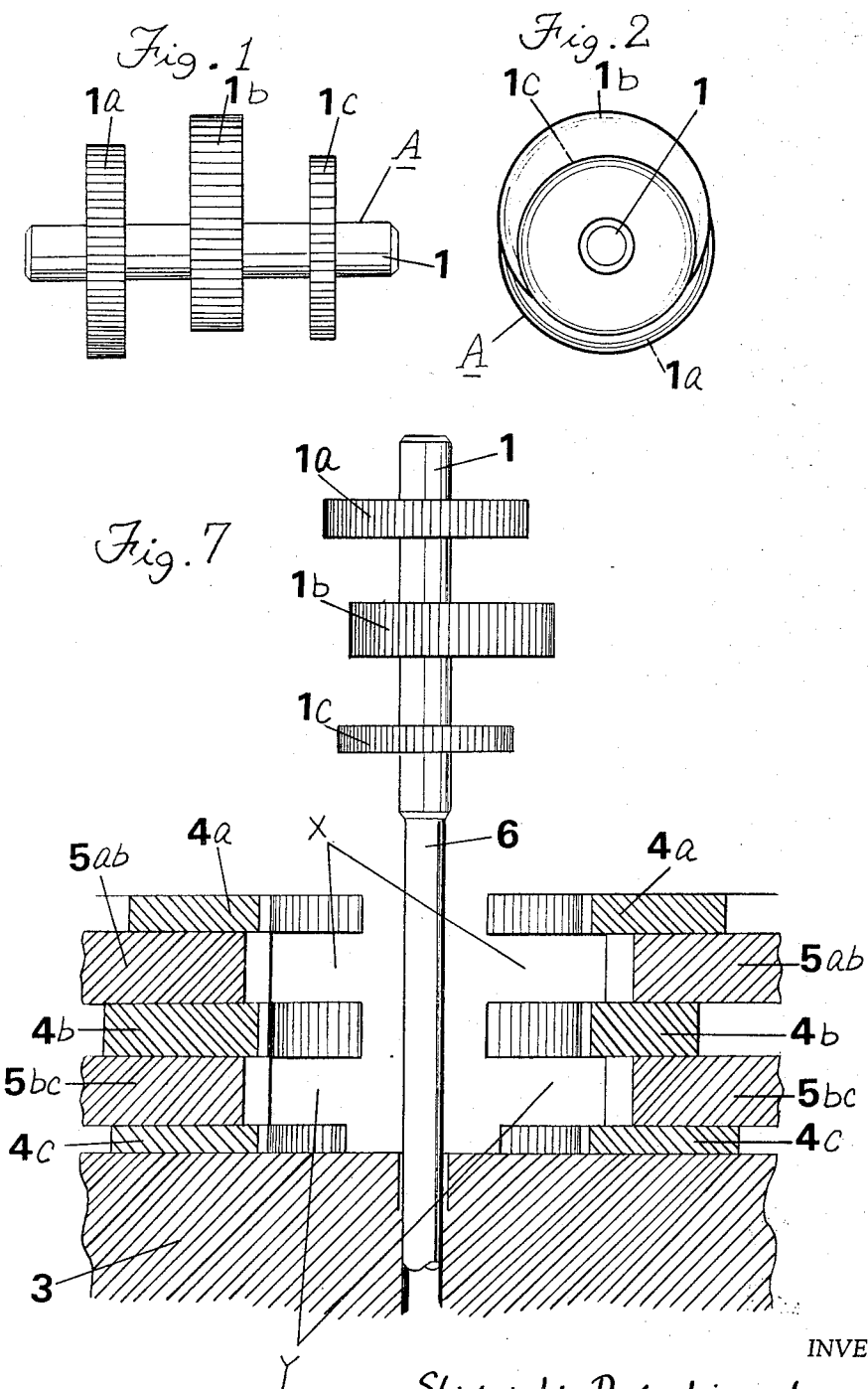

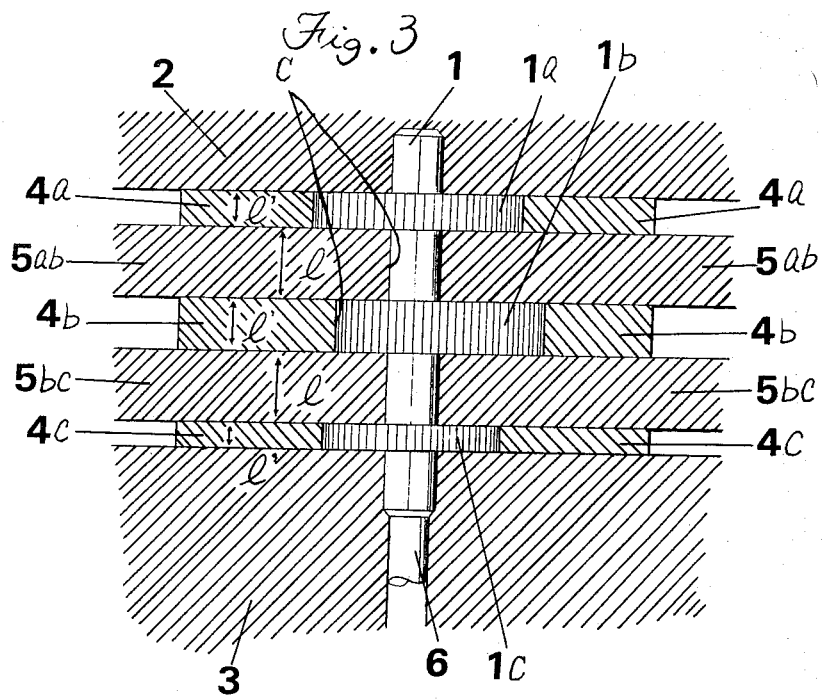
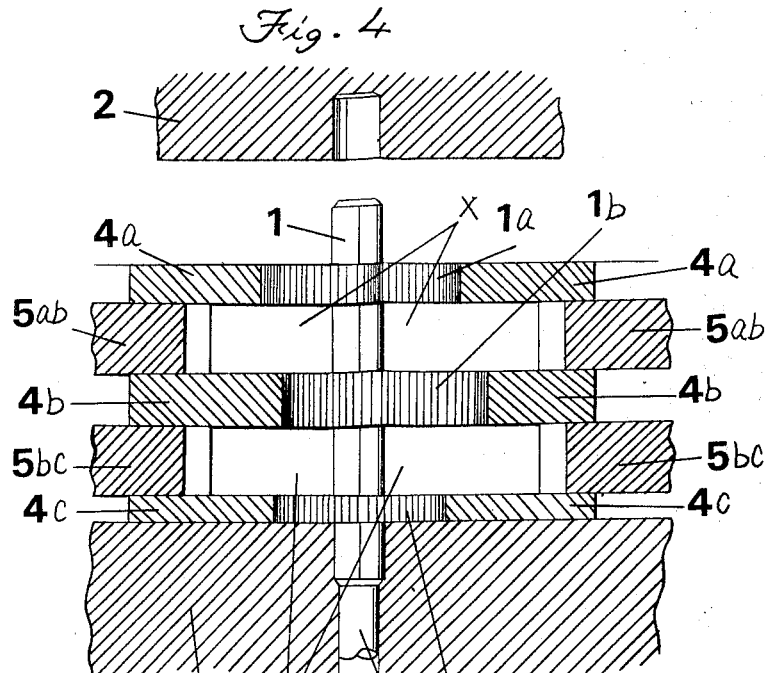

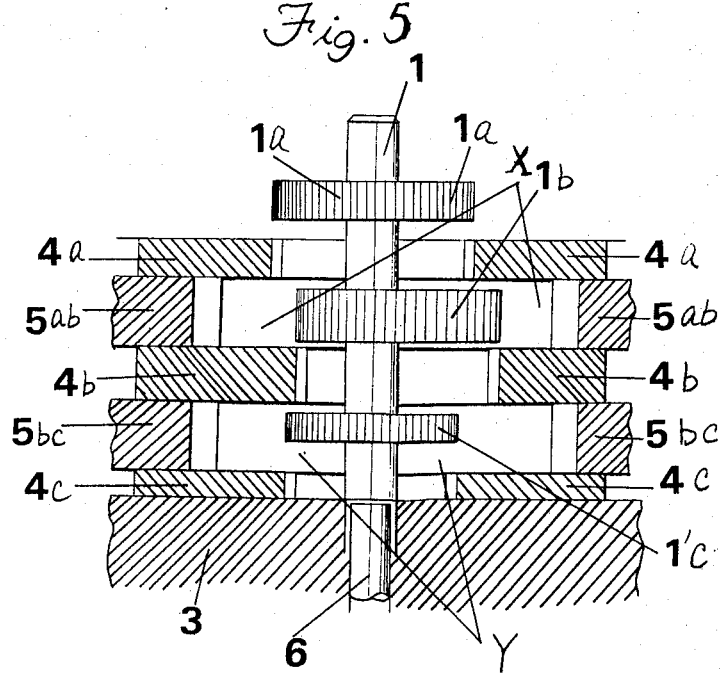
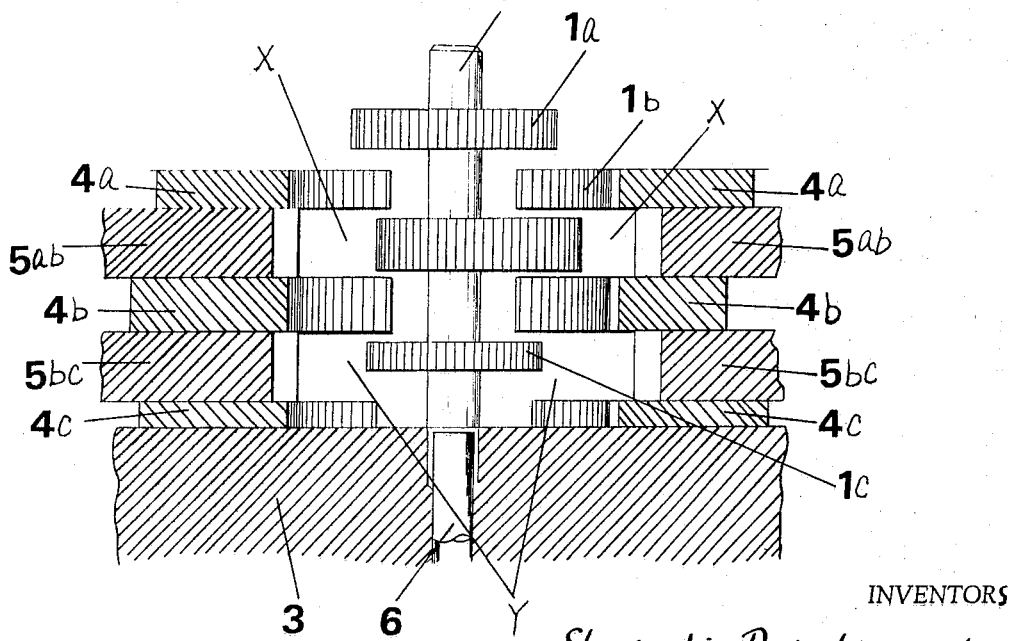

ABSTRACT OF THE DISCLOSURE

A molding method thereof for molding, by means of a two-piece split mold, an article having a plurality of flanges which have contours different from one another and extend radially outwardly from an integral shaft, wherein flashes to be inevitably produced on the periphery of a molded article along the parting lines of the split mold are minimized.

---

This invention relates to a method of molding an article having flanges with a space between.

More particularly, it relates to a molding method and a mold to be advantageously employed in said method for producing an article that has a plurality of flanges which extend radially outwardly from an axially extending shaft and are integrally connected to said shaft with a space therebetween, at least one of said flanges being eccentric to or different in plan from the others and/or provided with ribs extending axially around its outer periphery.

An article such as a spool having flanges which are equal to each other in their dimensions could readily be molded by a mold or mold sections which are radially horizontally separable or removable in two halves, while if one of flanges of such article is provided with ribs such as teeth of a cog-wheel, it is required for releasing the article from the mold to split the mold radially into more than two halves, thereby inevitably producing flashes on the molded article at the more than two portions which correspond to the parting lines of the mold. Such flashes require to be finished after the removal of article from the mold and often prevent certain molded articles such as cog-wheels from being very precise even when they were subjected to finishing. Hence, wherever possible, it is advisable to plan the layout of a multicavity mold so that it has the least number of parting lines.

Even in the above case where flanges or undercuts of an article are provided with such ribs which prevent a split mold from moving horizontally outwardly from the molded article by halves, it is possible to mold said article by means of a two-piece mold, provided that the flanges and ribs thereof are all axially in alignment with each other, by first splitting the mold sections which are shaped to the contour corresponding to the outer contour of shaft portions of the article to make a cavity for said shaft portions, thereby making it possible to move the article in its axial direction, and second, knocking out the article axially through the other closed mold sections which form a cavity for the flanges, by forcibly pressing the article at one of its ends.

However, these steps are not applicable to the molding of an article having flanges, at least one of which is eccentric to or different in plan from the other and/or provided with ribs extending axially around its outer periphery, because in the aforementioned second step, said particular flange can not pass through the cavity for other flanges.

The present inventors have tried to find a molding method and mold therefor that can mold an article of the kind above defined by splitting the mold in the least number of parting lines, viz., only two halves: said method, more substantially, comprising forming a mold cavity provided with a contour corresponing to the contour of the article having a plurality of flanges which extend radially outwardly from an axially extending shaft and are integrally conected to said shaft with a space therebetween, at least one of said flanges being eccentric to or different in plan from the others and/or provided with ribs extending axially around its outer periphery and said space having its axial length greater than that of flanges, by using at least one split mold which forms a cavity for said flanges and is separable into two halves and at least one other split mold which forms a cavity for said shaft and is separable at least into two halves; forming the molded article in the aforementioned mold cavities; splitting the secondly-mentioned split mold to such an extent that it makes a space through which the flanges can pass; moving the molded article in its axial direction until it reaches a location where the flanges can be accommodated in said space and free from the first-mentioned split mold; splitting said first-mentioned split mold to such an extent that it affords a space through which the molded article can pass; and taking out the molded article completely from the mold cavity.

And, the present invention mold the inventors have discovered, more substantially, comprises: a mold cavity provided with a contour corresponding to the contour of an article having a plurality of flanges which extend radially outwardly from an axially extending shaft and are integrally connected to said shaft with a space therebetween, at least one of said flanges being eccentric to or different in plan from the others and/or provided with ribs extending axially around its outer periphery and said space having an axial distance larger than that of flanges; said mold cavity including at least one split mold which forms a cavity for said flanges and is separable into two halves and at least one other split mold which forms a cavity for said shaft and is separable at least into two halves, said second-mentioned split mold being separable to such an extent that it makes a space through which the flanges can pass: a knockout pin being provided to the mold cavity and operable coaxially with said mold cavity into a first position where it shifts the article molded in the mold cavity so as to bring the flanges of the article into the aforementioned space and consequently to make said flanges free from their engagement with the first-mentioned split mold and into a second position where it further shifts said molded article after said first-mentioned split mold is separated to such an extent that it affords a space through which the molded article can axially pass, so as to release the molded article completely from the mold cavity.

Hence, it is an object of the present invention to provide a novel molding method producing, by a two-piece split mold, an article having a plurality of flanges which have different contours one from another and extend radially outwardly from an integral shaft, whereby flashes on the molded article are minimized and the constructions of the mold are simplified.

It is another object of the present invention to provide a novel split mold which can effectively and positively mold an article of the kind above-mentioned.

Further objects and advantages of the present invention will be apparent from the following description, reference being had to the accompanying drawings in which a preferred embodiment of the present invention is clearly shown.

In the drawings:

FIG. 1 shows a front view of an article to be molded in accordance with the present invention, molding method and mold, said article being, in this instance, multi-cogwheels integrally made with a shaft, FIG. 2 is a plan view of the article shown in FIG. 1, FIG. 3 is a cross sectional view of the mold with the article shown in FIGS. 1 and 2 molded therein, FIG. 4 is a cross sectional view of the mold similar to FIG. 3, in which the top plate of the mold is shifted axially upwardly, FIG. 5 is a cross sectional view of the mold similar to FIGS. 3 and 4, in which the mold for the shaft is separated and the molded article is shifted as a whole upwardly to a position where the cog-wheels are accommodated in the space formed by this split mold and released from the engagement with the mold for the cogwheels.

FIG. 6 is a cross sectional view of the mold similar to FIGS. 3 to 5, in which the mold forming the cavity for cog-wheels is also split, and FIG. 7 is a cross sectional view of the mold similar to FIGS. 3 to 6, in which the molded article is axially shifted further upwardly so as to be released from the mold.

In FIGS. 1 and 2, there is shown multi-cog-wheels A integrally made with a shaft 1, as an example of the article moldable in accordance with the present invention. Cog-wheels 1a, 1b and 1c are respectively provided with teeth of different pitches which extend radially outwardly from the shaft. They have different diameters and one of them is eccentric to the shaft. Though the shaft illustrated in the drawing is a straight shaft with a cylindrical periphery, it need not be straight and cylindrical but could be a crank shaft, for instance. And, its periphery could be a regular, concave or convex polygon in cross section, for instance. In other words, the article moldable in accordance with the present invention is one that has a plurality of flanges which extend radially outwardly from an axially extending shaft and are integrally connected to said shaft with a space therebetween at least one of said flanges being eccentric to or different in plan from the others and/or provided with ribs extending axially around its outer periphery. The portions of the article termed in the above as "a plurality of flanges" correspond to the cog-wheels 1a, 1b and 1c of the present embodiment, and "ribs" correspond to their teeth sections.

Numeral 2 indicates a cover plate and numeral 3 a bottom plate. A split mold consisting of mold sections 4a, 4b and 4c and forming a cavity for the cog-wheels 1a, 1b and 1c is separable into two halves. Another split mold consisting of mold sections 5ab and 5bc and forming a cavity for the shaft 1 together with the force 2 and the bottom plate 3 is also separable into two halves or more. These split molds might be mounted in an angle molding press, not shown, and operated by side hydraulic cylinders of sufficient power to hold them together against the pressure of molding material tending to push them apart.

Though in the present embodiment, the mold, comprising sections 5ab and 5bc is constructed so as to be split into two halves, it could be made so as to be separable into more than two halves in a case where shaft 1 is of concave or convex polygonal cross section, for instance, or other complex configurations.

It is essential for operating the present molding method and its mold that the axial depth 1 (FIG. 3) of the split mold for the shaft should be equal to or greater than that 1' of the split mold for the cog-wheels. In other words, the flanges of article, viz, the cog-wheels 1a, 1b and 1c in the embodiment illustrated in the drawing should be integrally connected to the shaft 1 with a space therebetween which is larger than the thickness of the cog-wheels.

A knockout pin 6 is provided to the bottom plate 3 and operable coaxially with a mold cavity formed by the aforementioned two split molds into projected and retracted positions.

Into the mold cavity formed by the two split molds and provided with the contour corresponding to that of the multi-cog-wheels A, molding material is introduced, and the molded article A is formed therein, as shown in FIG. 3. After removal of the cover plate 2 from the mold axially upwardly in the drawing to a distance corresponding to the axial length of the molded article A, the split mold consisting of sections 5ab and 5bc is separated into two halves to such an extent that it can make a space X and Y in which the cog-wheels 1b and 1c may respectively be accommodated, as shown in FIG. 4.

Next, as shown in FIG. 5, the knockout pin 6 is operated to move the molded article A in its axial direction until it reaches a position where the cog-wheel 1a comes out from the split mold section 4a and the other cog-wheels 1b and 1c are respectively accommodated in said spaces X and Y and become free from the engagement with the split mold sections 4b and 4c. Then, the split mold consisting of mold sections 4a, 4b and 4c is split to such an extent that it can afford a space through which the molded article A can pass, as shown in FIG. 6, and the article is then completely released from the mold cavity by the knockout pin 6 operated to a further projected position.

While the embodiment of the invention as herein disclosed constitutes a preferred form, it is to be understood that other forms might be adopted.

What is claimed is:

1. The method of molding an article which has an axially-extending shaft and a plurality of flanges integral with said shaft and extending radially outwardly therefrom, said flanges being spaced from one another axially of said shaft a distance greater than the thickness of said flanges, at least one of said flanges being provided with ribs around its periphery and being different in a section in a plane transverse to the axis of said shaft from another of said flanges, comprising using two separate split molds, one of which is shaped to form a plurality of mold cavities having contours corresponding to the desired contour of said shaft, and the other of which is shaped to form a plurality of mold cavities having contours and axial depths, respectively, corresponding, respectively, to the desired contours and axial depths of said flanges, closing the two molds, introducing into the closed molds a moldable material to mold the article in the cavities of the two molds, then splitting said one mold by moving its parts radially away from one another to such an extent that it makes openings large enough in area to receive said flanges, then moving the molded article one step axially to move said flanges out of said other mold and into the open areas of said one mold, then splitting said other mold to such an extent that it affords a second series of openings large enough in area for the flanges of the molded article to pass axially therethrough, and then moving the article axially to clear it completely from the two molds.

2. A method as claimed in claim 1, wherein each of said molds has a plurality of sections, and the sections of the two molds alternate with each other in the axial direction, all of the sections of said one mold forming cavities corresponding to the desired contour of the shaft, and the sections of the other mold having contours corresponding, respectively, to the desired contours of the several flanges, and wherein after the article has been molded, it is moved axially just far enough to bring the several flanges, respectively, into the respective openings formed in the next adjacent sections, respectively, of said one mold, and then said other mold is split to open its mold cavities to an extent to permit the article to be moved axially completely clear of the molds.

References Cited

UNITED STATES PATENTS

| | | | |
|---|---|---|---|
| 3,243,490 | 3/1966 | Ulmschneider | 264—318 |
| 2,464,051 | 3/1949 | Morin | 264—318 |

ROBERT F. WHITE, Primary Examiner

J. R. HALL, Assistant Examiner